United States Patent Office 3,291,891
Patented Dec. 13, 1966

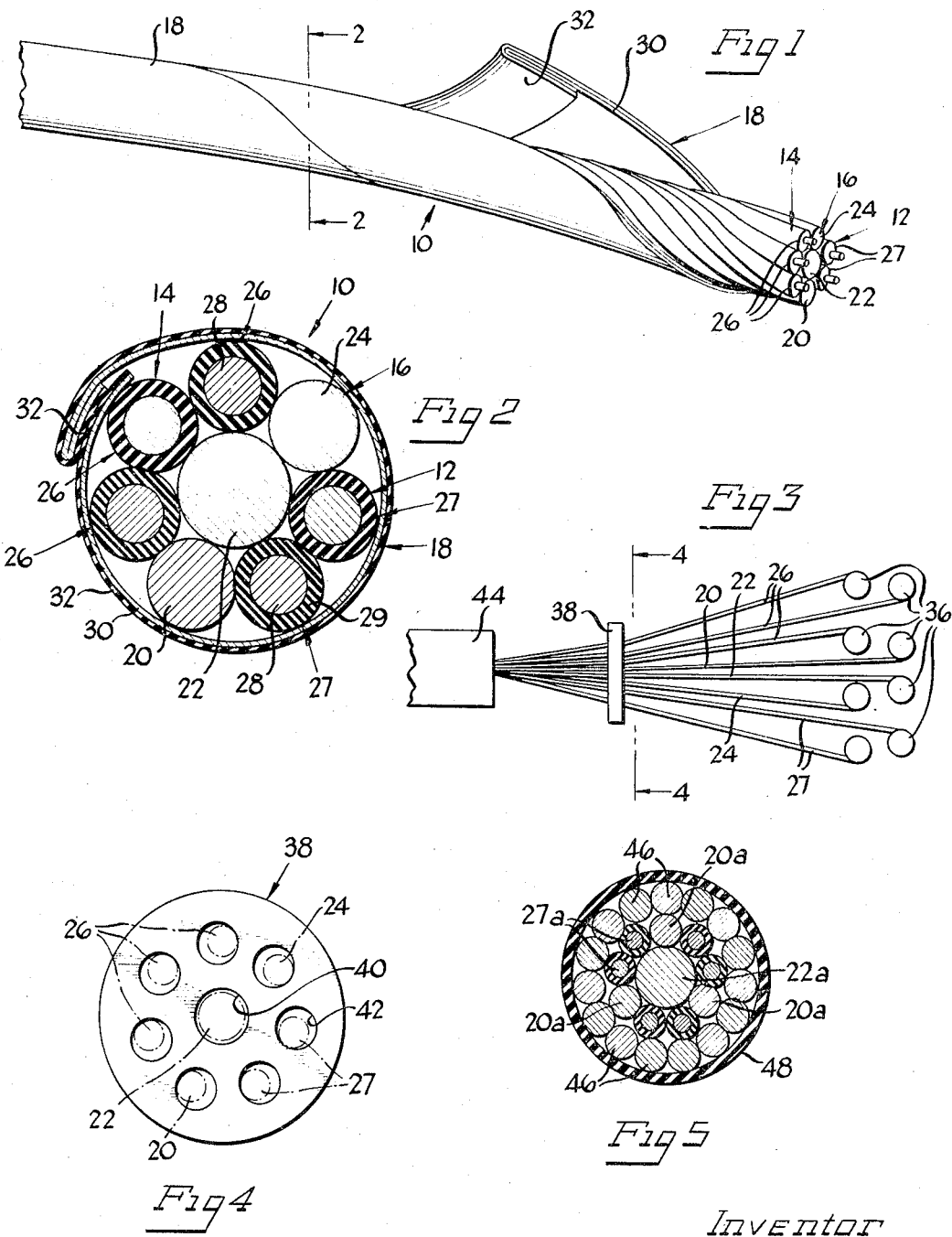

3,291,891
SHIELDED ELECTRIC CABLES
Robert E. Sharp, Richmond, Ind., assignor to Belden Manufacturing Company, Chicago, Ill., a corporation of Illinois
Filed Mar. 23, 1964, Ser. No. 354,080
7 Claims. (Cl. 174—36)

The present invention relates to electric cables and more particularly to a miniature electrical cable in which groups of conductors are shielded from one another.

Previously, there have been various electrical cable constructions in which groups of conductors have been shielded from one another. For example, in one of these prior constructions, concentric layers of conductors were alternated with layers of shielding. Another prior construction involved structure having a number of shielded compartments in which conductors were disposed. While these constructions provided acceptable shielding, the cables were quite bulky and costly.

An object of the present invention is the provision of a multiple-conductor electrical cable in which groups of conductors are shielded from one another. Another object of the invention is the provision of such a cable in a minimum space and with a minimum use of material. Still another object is the provision of a multiple-conductor shielded electrical cable which is compact and economical to produce.

Other objects and advantages of the present invention will become apparent from the following description and the accompanying drawings, wherein:

FIGURE 1 is a perspective view of a length of electrical cable embodying various features of the invention, the cable having a portion of its outer shield or cover removed to reveal details of its construction;

FIGURE 2 is an enlarged sectional view taken generally along line 2—2 of FIGURE 1;

FIGURE 3 is a diagrammatic plan view illustrating a method of producing a cable such as shown in FIGURE 1;

FIGURE 4 is an enlarged front view of a guide plate employed in the method illustrated in FIGURE 3; and FIGURE 5 is a transverse sectional view illustrating another embodiment of the cable.

Generally, the illustrated multiple-conductor shielded electrical cable 10 includes two groups 12 and 14 of insulated conductors, and a group 16 of uninsulated conductors which extend generally longitudinally in the cable. The group 16 of uninsulated conductors is positioned between the groups of insulated conductors and in contact with each other, so as to provide a shield between the insulated conductors. The groups of conductors 12, 14 and 16 are provided with an external shield 18 which contacts the group 16 of uninsulated conductors.

More specifically, the illustrated miniature multiple-conductor shielded cable 10, shown in FIGURES 1 and 2 includes three uninsulated conductors 20, 22 and 24 forming the group 16 of uninsulated conductors. The uninsulated conductors 20, 22 and 24 may be of tinned or untinned copper wire. One of the uninsulated group 16 is disposed at the center of the cable 10 and the other uninsulated conductors 20 and 24 are disposed in contact with the center conductor 22 at approximately diametrically opposite points on the surface thereof to thereby effectively divide the concentric layer or space adjacent the surface of the middle conductor 22 into two segments. The center conductor 22 is of larger diameter than the two conductors 20 and 24 to aid in forming a compact cable as hereinafter explained.

As shown particularly in FIGURE 2, three insulated conductors 26, which form the group 14, are disposed circumferentially along the surface of the center conductor 22 in one of the segments and in contact with the center conductor 22. Two insulated conductors 27, which form the other group 12, are disposed circumferentially along the opposite surface of the center conductor 22 in the other segments and in physical contact with the center conductor. The insulated conductors 26 and 27 are of the same diameter as the outer uninsulated conductors 20 and 24 and may be magnet wire 28 having an outer film 29 of insulation material, such as enamel or other commonly used magnet wire insulation. The group 16 of uninsulated conductors thus divides the insulated conductors 26 and 27 into two shielded groups 12 and 14.

In the illustrated cable 10, the center conductor 22 is disposed generally longitudinally in the cable. The conductors 20, 24, 26 and 27 are spirally wound about the center conductor 22. In order to provide a compact cable, the center conductor 22 is preferably made of a diameter such that the concentric layer of insulated and uninsulated conductors 20, 24, 26 and 27 are in contacting side by side relation and also contact the center conductor 22.

The illustrated cable 10 is provided with the outer shield 18 which comprises an elongated strip 30 of metal foil which is insulated on one side by a film 32 of a suitable material such as polyethylene terephthate resin, (sold under the trademark "Mylar"), vinyl or polyethylene. The insulated metal foil 30, is spirally wrapped around the conductors with the uninsulated side thereof facing inwardly and with longitudinal marginal portions thereof overlapping.

To prevent possible undesired electrical contact between an exposed peripheral edge of the wrapped foil strip 30 and an external point, the edge of the outer overlapping marginal portion of the illustrated wrapped foil strip 30 is insulated by being turned under, as shown best in FIGURE 2. The spirally wound foil strip 30 is prevented from acting as an inductance by the uninsulated conductors 20 and 24 which make electrical contact with the uninsulated side of each turn of the foil strip 30, and with the uninsulated conductor 22 thereby creating a shorted turn. Ordinarily, one end of the group of uninsulated conductors is grounded to thereby act as a drain for the foil strip 30.

The foil wrapped conductors may be enclosed by a jacket (not shown) of a suitable material. However, in certain applications it is not necessary to use a jacket. In such applications the desired configuration of cable is maintained by attaching the insulation of the folded-under marginal portions of the insulated foil strip 30 to the opposite insulation in the area designated 32 in FIGURE 2.

A "self-jacket" is thus formed. This may be accomplished by providing a layer of heat sealable material on the film 32.

FIGURE 3 illustrates diagrammatically a method and apparatus for the production of the illustrated cable 10. As shown in FIGURE 3, a supply of each of the uninsulated conductors 20, 22 and 24 and the insulated conductors 26 and 28 is provided by spools 36. The spools 36 are arranged to feed the conductors through spaced-apart holes in a guide plate 38. As illustrated in FIGURE 4 the guide plate 38 has a center hole or aperture 40 and seven holes or apertures 42 spaced apart generally concentrically around the center hole. The center hole 40 receives the center uninsulated conductor 22 while the seven holes 42 receive the conductors 20, 24, 26 and 27 in the general configuration which they have in the completed cable 10, as shown best in FIGURE 2. Thus, each conductor is located in generally its predetermined position relative to the other conductors in the cable.

From the guide plate 38, the conductors pass through a common hole or aperture in the entrance to a cabling machine 44. Substantially uniform tension is maintained on the conductors between the guide plate 38 and the aperture in the cabling machine 44 to prevent misalignment of the conductors. By passing the conductors all through the single aperture and maintaining tension on them, the conductors are brought into contact with one another in generally their predetermined relative locations.

In the cabling machine 44, the conductors are spirally wound about the center conductor 22 without disturbing their predetermined relative locations. The foil strip 30 is wrapped around the conductors and may be either provided with a jacket or sealed to complete the cable 10.

By shielding conductors as described above, a multiple-conductor electrical cable of very small size (e.g. smaller than .050 inch) may be achieved. Further, this construction permits a multiple-conductor shielded cable to be produced in a single continuous operation to further reduce the cost of the product.

While the use of the wound foil strip 30 produces a very small size cable, where size is not critical it may be desirable to provide a heavier shield or covering. In the embodiment shown in FIGURE 5, wherein the elements which correspond generally with those in FIGURES 1 to 3 are designated with the same reference numeral and a suffix "a," a spirally wound intermediate concentric layer of conductors is comprised of three uninsulated conductors 20a disposed in contact with the center conductor 22a. The uninsulated conductors 20a are spaced so as to divide the concentric layer or space adjacent the surface of the center conductor into three equal segments. Three groups of two insulated conductors 27a are respectively disposed along the three surface areas. Instead of an outer shield or cover provided by a wound foil strip, the cable includes a plurality of uninsulated conductors 46 spirally wound about the intermediate layer in side by side relation and in contact with the uninsulated conductors 20a. An insulation jacket 48 is disposed about the uninsulated conductors 46.

Various modifications and changes may be made in the above-described cable constructions without departing from the spirit or scope of the invention. Various features of the invention are set forth in the following claims.

What is claimed is:

1. An electrical cable comprising at least two insulated conductors, a plurality of contacting uninsulated conductors disposed between said insulated conductors so as to provide a barrier therebetween, and a metallic conductive shield disposed over said conductors in electrical contact with at least one of said uninsulated conductors.

2. A multiple-conductor electrical cable comprising a first uninsulated conductor, a second uninsulated conductor in contact with said first conductor, at least one additional uninsulated conductor in contact with said first conductor but spaced from said second conductor, a plurality of insulated conductors disposed about the periphery of said first uninsulated conductor and divided by said second and said additional uninsulated conductor, and a metallic shield disposed about said conductors in electrical contact with said second and said additional uninsulated conductors.

3. A multiple-conductor electrical cable comprising a first uninsulated conductor, a second uninsulated conductor in contact with said first conductor, at least one additional uninsulated conductor in contact with said first conductor but spaced from said second conductor, a plurality of insulated conductors disposed about the periphery of said first uninsulated conductor and divided by said second and said additional uninsulated conductors, and a shield disposed about said conductors in electrical contact with said second and said additional uninsulated conductors, said shield including a plurality of uninsulated shield conductors spirally wrapped about said conductors in side by side relation with adjacent uninsulated conductors contacting each other and forming a continuous shield about the periphery of said conductors.

4. A multiple-conductor electrical cable comprising a first uninsulated conductor, a second uninsulated conductor in contact with said first conductor, at least one additional uninsulated conductor in contact with said first conductor but spaced from said second conductor, a plurality of insulated conductors disposed about the periphery of said first uninsulated conductor and divided by said second and said additional uninsulated conductor, and a shield disposed about said conductors, said shield in contact with said second and said additional uninsulated conductors, said shield including a foil strip insulated on one side spirally wrapped about said conductors with the conductive side thereof facing inwardly and with longitudinal marginal portions thereof overlapping.

5. A multiple-conductor electrical cable comprising a first uninsulated conductor, a second uninsulated conductor in contact with said first conductor, at least one additional uninsulated conductor in contact with said first conductor but spaced from said second conductor, a plurality of insulated conductors disposed about the periphery of said first uninsulated conductor and divided by said second and said additional uninsulated conductor, and a shield disposed about said conductors in electrical contact with said second and said additional uninsulated conductors, said shield including a foil strip insulated on one side spirally wrapped about said conductors with the conductive side thereof facing inwardly and with longitudinal marginal portions thereof overlapping, the edge of the outer overlapping marginal portion of said strip being turned under.

6. A multiple-conductor electrical cable comprising a first uninsulated conductor, a second uninsulated conductor in contact with said first conductor, at least one additional uninsulated conductor in contact with said first conductor but spaced from said second conductor, a plurality of insulated conductors disposed about the periphery of said first uninsulated conductor and divided by said second and said additional uninsulated conductor, and a shield disposed about said conductors in contact with said second and said additional uninsulated conductors, said shield including a foil strip insulated on one side spirally wrapped about said conductors with the insulated side thereof facing outwardly and with longitudinal marginal portions thereof overlapping the edge of the outer overlapping marginal portion of said strip being turned under and sealed to the adjacent insulated side of said foil.

7. A multiple-conductor electrical cable comprising a first uninsulated conductor, second uninsulated conductor in contact with said first conductor, at least one additional uninsulated conductor in contact with said first conductor but spaced from said second conductor, a plurality of insulated conductors disposed about the periphery of said first uninsulated conductor and divided by said second and said additional uninsulated conductor, and a shield disposed about said conductors in contact with said second and said additional uninsulated conductors, the second and said additional uninsulated conductors having the same diameter as the insulated conductors, the first conductor having a diameter such that the second and said additional uninsulated conductors and all the insulated conductors contact the first conductor and are in contacting side by side relation.

References Cited by the Examiner

UNITED STATES PATENTS

| | | | |
|---|---|---|---|
| 1,008,370 | 11/1911 | Robillot | 174—113 |
| 3,032,604 | 5/1962 | Timmons | 174—36 X |

FOREIGN PATENTS 144,874   3/1936   Austria.

LEWIS H. MYERS, *Primary Examiner.*

JOHN F. BURNS, ROBERT K. SCHAEFER, *Examiners.*

D. A. KETTLESTRINGS, H. HUBERFELD,
*Assistant Examiners.*